(12) United States Patent
Anderson et al.

(10) Patent No.: US 8,392,030 B2
(45) Date of Patent: Mar. 5, 2013

(54) SYSTEM AND METHOD FOR CONTROL FOR REGENERATIVE ENERGY GENERATORS

(75) Inventors: Zackary M. Anderson, Cambridge, MA (US); Sean Morton, Somerville, MA (US); Zachary J. Jackowski, Somerville, MA (US); Ryan Bavetta, Aptos, CA (US)

(73) Assignee: Levant Power Corporation, Woburn, MA (US)

( * ) Notice: Subject to any disclaimer, the term of this patent is extended or adjusted under 35 U.S.C. 154(b) by 229 days.

(21) Appl. No.: 12/784,775

(22) Filed: May 21, 2010

(65) Prior Publication Data

US 2010/0262308 A1 Oct. 14, 2010

Related U.S. Application Data

(63) Continuation-in-part of application No. 12/104,800, filed on Apr. 17, 2008.

(60) Provisional application No. 61/230,145, filed on Jul. 31, 2009.

(51) Int. Cl.
*G06F 19/00* (2006.01)

(52) U.S. Cl. ........................... 700/286; 318/375

(58) Field of Classification Search .................. 318/375, 318/376; 700/286, 291
See application file for complete search history.

(56) References Cited

U.S. PATENT DOCUMENTS

| | | | |
|---|---|---|---|
| 998,128 A | 7/1911 | Smithp | |
| 1,116,293 A | 11/1914 | Kane | |
| 1,290,293 A | 1/1919 | Morski | |
| 2,194,530 A | 3/1940 | Torstensson | |
| 2,885,202 A | 5/1959 | Trumper et al. | |
| 2,958,292 A | 11/1960 | Lipe et al. | |
| 3,507,580 A | 4/1970 | Howard | |
| 3,515,889 A | 6/1970 | Kammerer | |
| 3,559,027 A | 1/1971 | Arsem | |
| 3,688,859 A | 9/1972 | Hudspeth et al. | |
| 3,800,202 A | 3/1974 | Oswald | |

(Continued)

FOREIGN PATENT DOCUMENTS

| | | |
|---|---|---|
| DE | 3937987 A1 | 5/1991 |
| DE | 195 35 752 A1 | 3/1997 |

(Continued)

OTHER PUBLICATIONS

Shen et al., Automative EletricPower and Energy Mangment a system Approach, 2003, University of Michigan—Deabron; pp. 1-5.*

(Continued)

*Primary Examiner* — Kidest Bahta
(74) *Attorney, Agent, or Firm* — Wolf, Greenfield & Sacks, P.C.

(57) ABSTRACT

A device and system that can dynamically provide variable load on a generator and intelligently distribute generated power to loads and energy storage devices is disclosed. One system includes load profile controllers that employ a switching strategy to dynamically vary the load the generator induces while producing regenerative energy. This switching strategy may allow for a wide dynamic range of configurable damping characteristics, as well as decouple generator damping and the system output power. Multiple load profile controllers can be used together via a communications network, such as a vehicle controller area network (CAN) bus. A central regeneration controller or existing electronic control unit (ECU) can issue commands to change damping performance in different load profile controllers. By networking multiple load profile controllers together in either a distributed or centralized manner, the system may allow for intelligent power routing, coordination of multiple energy-generating devices (such as regenerative shocks and brakes), and improved utilization of on-board energy storage devices.

57 Claims, 9 Drawing Sheets

U.S. PATENT DOCUMENTS

| | | | |
|---|---|---|---|
| 3,803,906 | A | 4/1974 | Ross |
| 3,921,746 | A | 11/1975 | Lewus |
| 4,032,829 | A | 6/1977 | Schenavar |
| 4,033,580 | A | 7/1977 | Paris |
| 4,216,420 | A | 8/1980 | Jinbo et al. |
| 4,295,538 | A | 10/1981 | Lewus |
| 4,401,926 | A | 8/1983 | Morton et al. |
| 4,480,709 | A | 11/1984 | Commanda |
| 4,500,827 | A | 2/1985 | Merritt et al. |
| 4,606,551 | A | 8/1986 | Toti et al. |
| 4,625,993 | A | 12/1986 | Williams et al. |
| 4,673,194 | A | 6/1987 | Sugasawa |
| 4,729,459 | A | 3/1988 | Inagaki et al. |
| 4,740,711 | A | 4/1988 | Sato et al. |
| 4,815,575 | A | 3/1989 | Murty |
| 4,872,701 | A | 10/1989 | Akatsu et al. |
| 4,887,699 | A | 12/1989 | Ivers et al. |
| 4,908,553 | A | 3/1990 | Hoppie et al. |
| 4,921,080 | A | 5/1990 | Lin |
| 4,936,423 | A | 6/1990 | Karnopp |
| 4,981,309 | A | 1/1991 | Froeschle et al. |
| 5,034,890 | A | 7/1991 | Sugasawa et al. |
| 5,046,309 | A | 9/1991 | Yoshino et al. |
| 5,060,959 | A | 10/1991 | Davis et al. |
| 5,091,679 | A | 2/1992 | Murty et al. |
| 5,098,119 | A | 3/1992 | Williams et al. |
| 5,215,327 | A | 6/1993 | Gatter et al. |
| 5,243,525 | A | 9/1993 | Tsutsumi et al. |
| 5,276,622 | A | 1/1994 | Miller et al. |
| 5,291,960 | A * | 3/1994 | Brandenburg et al. .... 180/65.27 |
| 5,295,705 | A | 3/1994 | Butsuen et al. |
| 5,337,560 | A | 8/1994 | Abdelmalek et al. |
| 5,377,791 | A | 1/1995 | Kawashima et al. |
| 5,391,953 | A | 2/1995 | Van de Veen |
| 5,570,286 | A | 10/1996 | Margolis et al. |
| 5,590,734 | A | 1/1997 | Caires |
| 5,608,308 | A | 3/1997 | Kiuchi et al. |
| 5,659,205 | A | 8/1997 | Weisser et al. |
| 5,684,383 | A | 11/1997 | Tsuji et al. |
| 5,717,303 | A * | 2/1998 | Engel ............................ 318/376 |
| 5,764,009 | A | 6/1998 | Fukaya et al. |
| 5,794,439 | A | 8/1998 | Lisniansky |
| 5,839,800 | A | 11/1998 | Koga et al. |
| 5,941,328 | A | 8/1999 | Lyons et al. |
| 6,049,746 | A | 4/2000 | Southward et al. |
| 6,111,375 | A | 8/2000 | Zenobi |
| 6,349,543 | B1 | 2/2002 | Lisniansky |
| 6,394,238 | B1 | 5/2002 | Rogala |
| 6,441,508 | B1 | 8/2002 | Hylton |
| 6,559,553 | B2 | 5/2003 | Yumita |
| 6,575,484 | B2 | 6/2003 | Rogala |
| 6,592,060 | B1 | 7/2003 | Vomhof et al. |
| 6,631,960 | B2 | 10/2003 | Grand et al. |
| 6,765,389 | B1 | 7/2004 | Moore |
| 6,876,100 | B2 | 4/2005 | Yumita |
| 6,908,162 | B2 * | 6/2005 | Obayashi et al. ............. 303/152 |
| 6,920,951 | B2 | 7/2005 | Song et al. |
| 6,952,060 | B2 | 10/2005 | Goldner et al. |
| 6,964,325 | B2 | 11/2005 | Maes |
| 7,015,594 | B2 | 3/2006 | Asada |
| 7,023,107 | B2 * | 4/2006 | Okuda et al. ................. 307/10.1 |
| 7,034,482 | B2 | 4/2006 | Komiyama et al. |
| 7,087,342 | B2 | 8/2006 | Song |
| 7,335,999 | B2 | 2/2008 | Potter |
| 7,336,002 | B2 * | 2/2008 | Kato et al. ................... 307/10.6 |
| 7,392,998 | B2 | 7/2008 | Runkel |
| 7,854,203 | B2 * | 12/2010 | Kumar ............................ 105/35 |
| 2002/0060551 | A1 * | 5/2002 | Ikeda ............................ 320/104 |
| 2002/0070510 | A1 | 6/2002 | Rogala |
| 2002/0145404 | A1 * | 10/2002 | Dasgupta et al. ............. 320/116 |
| 2003/0034697 | A1 | 2/2003 | Goldner et al. |
| 2003/0150352 | A1 * | 8/2003 | Kumar ............................ 105/35 |
| 2003/0169048 | A1 * | 9/2003 | Kim et al. ..................... 324/426 |
| 2004/0119289 | A1 | 6/2004 | Zabramny |
| 2004/0207350 | A1 | 10/2004 | Wilton et al. |
| 2004/0212273 | A1 | 10/2004 | Gould |
| 2007/0018626 | A1 | 1/2007 | Chi |
| 2007/0089919 | A1 | 4/2007 | de la Torre et al. |
| 2007/0089924 | A1 | 4/2007 | De la Torre et al. |
| 2008/0012262 | A1 | 1/2008 | Carabelli |
| 2008/0238396 | A1 | 10/2008 | Ng et al. |
| 2008/0257626 | A1 | 10/2008 | Carabelli et al. |
| 2009/0260935 | A1 | 10/2009 | Avadhany et al. |
| 2010/0072760 | A1 | 3/2010 | Bavetta et al. |

FOREIGN PATENT DOCUMENTS

| | | |
|---|---|---|
| EP | 1878598 | 1/2008 |
| FR | 2152111 A | 4/1973 |
| FR | 2346176 A | 10/1977 |
| FR | 2661643 A1 | 11/1991 |
| GB | 652732 | 5/1951 |
| GB | 1070783 | 6/1967 |
| JP | 2003/035254 | 2/2003 |
| WO | WO 97/26145 A | 7/1997 |

OTHER PUBLICATIONS

International Search Report and Written Opinion from PCT Application PCT/US2009/040749 dated Jul. 15, 2009.

International Search Report and Written Opinion from PCT Application PCT/US2010/002116 dated Oct. 28, 2010.

International Search Report and Written Opinion from PCT Application PCT/US2010/002116 dated Jul. 29, 2010.

* cited by examiner

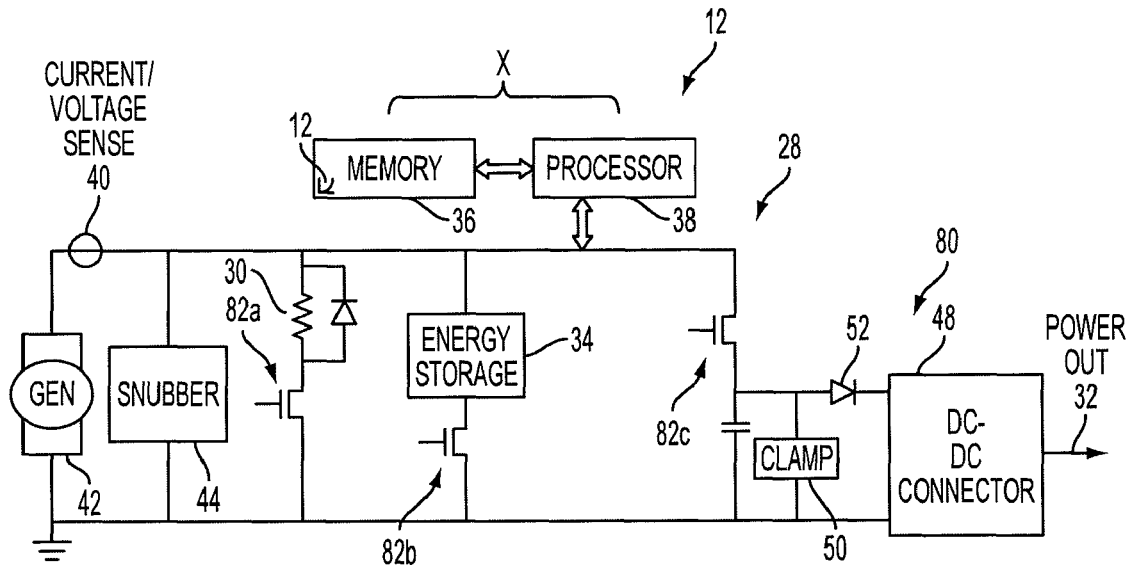

FIG. 2A

| MODE | OPERATION |
|---|---|
| 90 — LOAD LOW | EFFECTIVE RESISTANCE OF OUTPUT LOAD IS TOO LOW, SO WE NEED TO DISSIPATE ENERGY IN A SHUNT RESISTOR FOR PROPER DAMPING |
| 94 — LOAD MATCH | EFFECTIVE RESISTANCE OF OUTPUT LOAD (CAR POWER BUS) EQUALS THE RESISTANCE REQUIRED FOR DESIRED DAMPING |
| 92 — LOAD HIGH | EFFECTIVE RESISTANCE OF OUTPUT LOAD IS TOO HIGH, SO WE SWITCH BETWEEN THE OUTPUT LOAD AND AN OPEN CIRCUIT |

FIG. 3A

SYSTEM AND METHOD FOR CONTROL FOR REGENERATIVE ENERGY GENERATORS

This application is a continuation in part of U.S. application Ser. No. 12/104,800, filed Apr. 17, 2008, and claims the benefit of U.S. Provisional application 61/230,145, filed Jul. 31, 2009.

BACKGROUND

1. Field

Aspects relate to regenerative energy generator controllers and, more particularly to devices and systems that modulate a load on a generator and/or interconnect multiple power generation devices to a vehicle's power systems.

2. Discussion of Related Art

Modern automobiles such as hybrid electrics, military vehicles, and heavy trucks are increasingly being equipped with regenerative power sources, energy storage devices, and power-consuming equipment. Regenerative power sources such as regenerative shock absorbers have the potential to increase the fuel economy and/or other performance characteristics of these vehicles and in some cases improve ride performance.

SUMMARY OF INVENTION

Aspects of the invention relate to integration of regenerative power devices and their control with external power-consuming devices, other regenerative devices, and the capability of on-demand changes in damping forces and load profiles. Other aspects of the invention relate to the regulation and decoupling of power output by a regenerative device from the control of damping characteristics of the regenerative device, e.g., to provide safe and efficient charging of a changing electrical load, in tandem with the ability to vary generator load.

In one aspect of the invention, a system that manages power output from one or more energy generators includes at least one power controller having an input for connection to an energy generator to receive electrical power generated by the energy generator and an output for connection to an electrical load to provide electrical power to the electrical load. The power controller may also include switching circuitry to set a kinematic characteristic for the energy generator that influences motion of a mechanical system, and circuitry arranged to provide, over an extended time period and while maintaining the set kinematic characteristic for the energy generator, an amount of power to the electrical load that meets a demand of the electrical load but is unequal to an amount of power provided by the energy generator to the power controller. (By meeting the demand of an electrical load, it is meant that the amount of power supplied does not exceed a safe level for the electrical load, but does not necessarily mean that all the electrical energy the load can safely handle will be delivered.) A kinematic characteristic for the energy generator may be, for example, a damping affect on the energy generator such that the energy generator may affect the way a mechanical component moves. In one embodiment, the energy generator may be a linear electric motor that is coupled to a vehicle suspension and functions as a shock absorber. By adjusting a kinematic characteristic of the electric motor, the damping affect of the motor/shock absorber on the vehicle suspension may be adjusted. Other kinematic characteristics may relate to other types of motion other than linear motion, including rotary motion, movement about two or more pivot points, random motion, and others.

Thus, the power controller may use switching circuitry to adjust the kinematic characteristic of the generator, and influence the motion of the associated mechanical system. Also, the power controller may maintain the kinematic characteristic, e.g., an effective damping on a vehicle suspension, over an extended time period (which may be much greater than the switching period, e.g., an order of magnitude greater, or more) and simultaneously provide an amount of electrical power to the electrical load (e.g.; the vehicle electrical system) that is unequal to the amount of power that is produced by the generator. For example, the power controller may maintain a specific damping of a vehicle suspension even though the generator which produces the damping effect outputs an amount of electrical power that exceeds (or is less than) the vehicle's power requirements. In one embodiment the switching frequency may be 250 kHz and a particular damping characteristic can be maintained for as short as a 40 µs to as long as tens of seconds, or more. In many prior systems, damping of a regenerative device was adjusted so as to match the power output with an associated vehicle's power demands. What this meant was that damping control (e.g., shock absorber function) was sacrificed for the sake of essentially matching the load on the regenerative device with the electrical system load. Other systems simply ignored vehicle electrical system requirements, and instead controlled only the damping effect, e.g., so as to provide a particular ride feel or performance. However, such systems do not meet the vehicle's electrical system requirements. In contrast, a power controller in accordance with an aspect of the invention can meet the requirements of an electrical load (e.g., a vehicle electrical system) over an extended time period while also maintaining kinematic characteristics of a generator at a desired level (e.g., to provide a desired shock absorber damping response) that would cause the generator to produce less (or more) power than is demanded by the electrical load.

In another aspect of the invention, a power electronics system for use with a system having an electrical power generator and an electrical load includes one or more circuits having different impedance states, one or more switches that connect the electrical power generator to any one of the circuits having different impedance states, and a controller that selectively operates the one or more switches to selectively connect the electrical power generator to one of the circuits and to control the average impedance on the electrical power generator. Simultaneous with controlling the average impedance on the electrical power generator, the controller may operate the switches to control the amount of electrical power delivered to the electrical load and such that the amount of electrical power delivered to the electrical load is controlled independently of the average impedance on the electrical power generator. This feature may enable the power electronics system to not only supply energy to meet the demands of the electrical load (e.g., a vehicle's electrical system), but also provide a desired influence on the vehicle's movement (e.g., shock absorber performance, ride height, brake assistance, and others).

In another aspect of the invention, a system may include at least one electrical power generator operatively linked to a movable component of the system such that adjustment of a kinematic characteristic of the electrical power generator affects movement of the movable component. In one example, the generator may be a vehicle alternator, and adjustment of a kinematic characteristic of the alternator may help slow engine rotation so as to help stop a vehicle when braking. In another example, the generator may include motor coupled to a shock absorber such that adjustment of a kinematic characteristic of the motor may adjust the damping affect of the shock absorber on the vehicle's suspension. The system may also include an electrical load including one or more electrical components of the system, such as a vehicle battery, lights, appliances, heaters, and other energy-consuming devices. A control circuit of the system may have an electrical power output to deliver energy to the electrical load, and at least one input connected to the at least one electrical power generator. The control circuit may also include one or more circuits that set an average load across terminals of the at least one electrical power generator such that the average load across the terminals of the at least one electrical power generator is set independently of an impedance of the electrical load.

In another aspect of the invention, a method for controlling power generation and output in a system includes providing at least one electrical power generator that is coupled to a moveable component of a mechanical system such that adjusting a kinematic characteristic of the at least one electrical power generator influences motion of the moveable component. One of a plurality of different kinematic characteristics may be selected for the at least one electrical power generator, and electrical power generated by the at least one electrical power generator may be received such that the received electrical power is unequal to electrical power output to the electrical load. A connection of each electrical power generator to a plurality of different impedance states may be controlled so as to both maintain the selected kinematic characteristic for the at least one electrical power generator and provide a controllable amount of electrical power to the electrical load.

In another aspect of the invention, a method for controlling a plurality of regenerative power generators includes providing a plurality of electrical power generators that are each coupled to a respective moveable component of a mechanical system such that adjusting a kinematic characteristic of an electrical power generator influences motion of the respective moveable component. A kinematic characteristic may be selected for each of the electrical power generators (e.g., by selecting from two or more load profiles), and an effective impedance on each of the electrical power generators may be controlled based on the selected kinematic characteristic. Electrical power produced by the electrical power generators may be provided to one or more electrical loads such that control of the effective impedance for each electrical power generator is independent of electrical power provided to the electrical loads.

In another aspect of the invention, a method for controlling a plurality of regenerative energy sources includes switching circuitry to connect each of the devices between one or more electrical loads and energy storage devices. Regenerative energy sources may include mechanical systems (e.g. a regenerative brake motor, piezoelectric vibration energy harvester, or regenerative damper) or non-mechanical energy-recovering sources (e.g. thermoelectric waste heat generator). A controller dynamically switches each of the devices to optimize and coordinate power delivery from the regenerative energy sources to the one or more loads for efficient and regulated energy recovery from often intermittent sources.

These and other aspects of the invention will be apparent from the following description and claims.

BRIEF DESCRIPTION OF THE DRAWINGS

Various embodiments will now be described, by way of example, with reference to the accompanying drawings, in which:

FIG. 2A is a schematic showing selected circuit components in a single stage switching load profile controller;

FIG. 3A is a chart showing software modes of operation of a switching load profile controller;

DETAILED DESCRIPTION

Figure 1A:
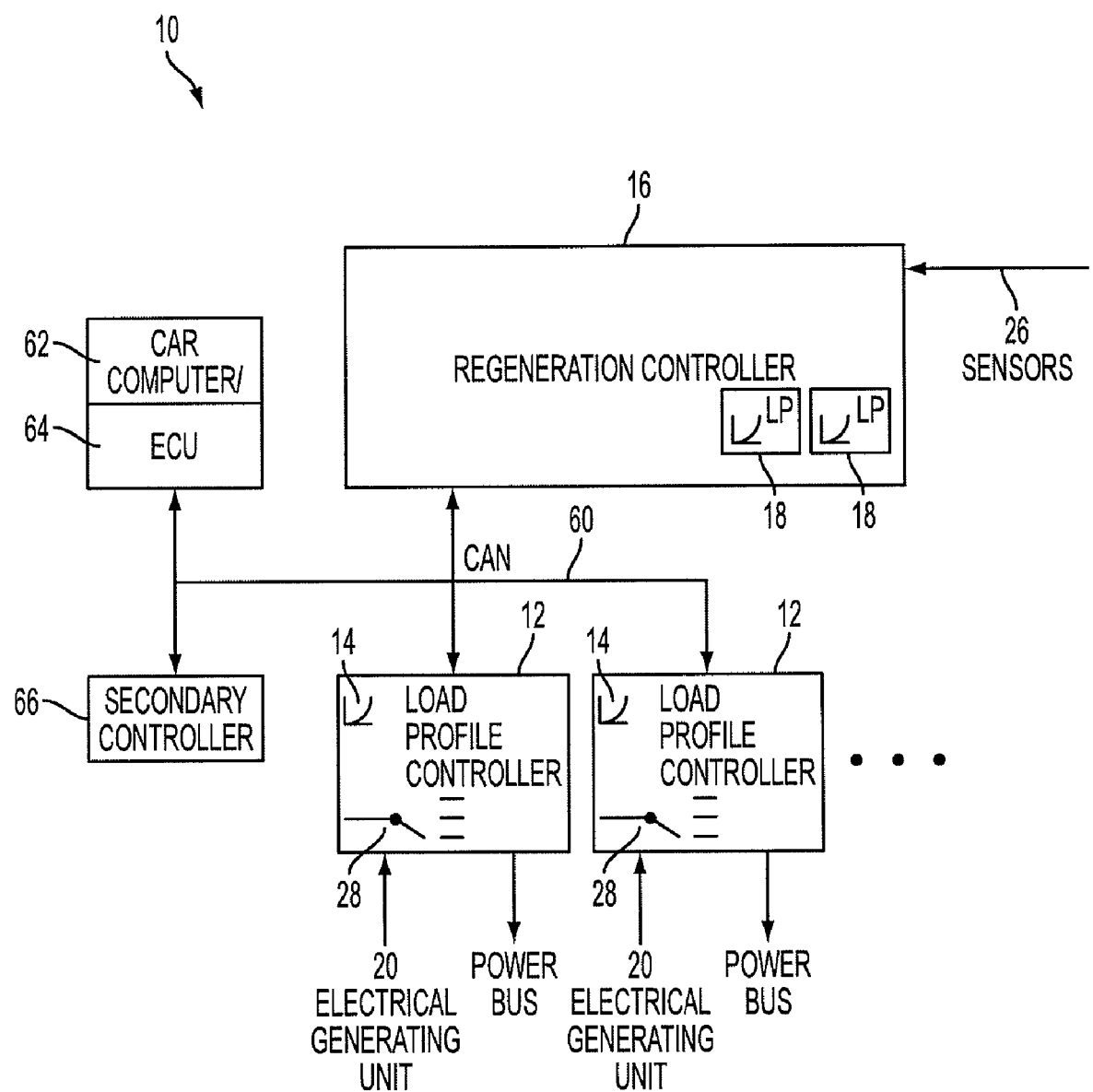
FIG. 1A is an embodiment of a system overview showing several load profile controllers and a central regeneration controller in a distributed power flow control configuration.

In accordance with one aspect of the invention, a system that can dynamically provide a variable load on a generator and intelligently distribute generated power to energy consuming devices and/or energy storage devices of an output load is disclosed. In one embodiment, the system can simultaneously provide variable damping of the generator (or other control of a kinematic characteristic of the generator) and independently variable output power to the output load. In an illustrative embodiment, the system includes one or more load profile controllers that employ a switching strategy to dynamically vary the load the generator induces while producing regenerative energy. This switching strategy may allow for a wide dynamic range of configurable kinematic characteristics. Multiple load profile controllers can be used to control multiple generators, and may be linked together via a communications network, such as a vehicle controller area network (CAN) bus, or a time-triggered controller area network (TTCAN) bus, or a FlexRay network, e.g., to allow for coordinated control. Methods of interface for the load profile controllers are not limited in this regard, however. A central regeneration controller (e.g., as part of an existing on-board vehicle controller) can issue commands to change damping or other kinematic performance for different load profile controllers. By networking multiple load profile controllers together in either a distributed or centralized manner, the system may allow for intelligent power routing, coordination of multiple energy-generating devices (such as regenerative shocks and brakes), and improved utilization of on-board energy storage devices and/or energy consuming devices.

Thus, in one embodiment, the system allows several regenerative devices to be utilized in a single vehicle system, while affecting particular characteristics in each regenerative device. One exemplary characteristic is damping, although other kinematic characteristics may be adjusted, as aspects of the present invention are not limited in this regard.

The arrangements described herein can be utilized to manage power from multiple energy generating sources and be utilized regardless of the type of the energy generating source. That said, in some embodiments described below, the power management arrangement is employed in a vehicle system having regenerative energy sources. For example, in one embodiment, a vehicle includes a plurality of regenerative shock absorbers, with each potentially providing generated energy to the vehicle electrical system. A regenerative shock absorber can be used in the vehicle suspension system to harnesses the energy derived from the relative movements between a vehicle wheel and a body of the vehicle as the wheel rides over an uneven surface, for example. The energy can be converted to electricity rather than wasted as heat. In one embodiment, the oscillating movement of the vehicle wheel assembly relative to the vehicle body or frame during vehicle operation causes reciprocating movements of pistons located within the shock absorber which in turn pumps liquid through a hydraulically actuated generator to produce electricity. In another embodiment, the movement of the vehicle wheel assembly can cause movement of a linear motor or similar arrangement which generates electrical power. The power management system(s) disclosed herein can be utilized to manage the power originating from the plurality of regenerative shocks regardless of the mechanism used to generate the electrical power. Other vehicle regenerative systems may also be employed, such as regenerative braking systems, as the present invention(s) are not limited in this regard. For example, a load profile controller may be coupled to a vehicle alternator and control a kinematic characteristic of the alternator, e.g., increase an impedance on the alternator to assist in vehicle braking.

In one illustrative embodiment, programmable load profile controllers may include a switching circuit that switches a load experienced by a generator between a high impedance state (such as an open circuit), a low impedance state (such as a short circuit) and an output load (such as a vehicle battery or vehicle electrical system). This switching strategy allows for the system to induce a wide dynamic range of damping or other kinematic characteristic control of the generator while harvesting energy.

An open-loop or closed-loop feedback controller may be employed in some embodiments to adjust a commanded switching rate to achieve a given induced load on the generator. This switching creates a time-averaged impedance across the terminals of the generator, which in effect creates some load (or "damping") of the generator, for example, on a shaft of the generator. In this regard, in one embodiment, the controller can provide kinematic characteristic control as governed by a given load profile stored in memory, and harness the maximal amount of energy within the confines of this load profile. In one embodiment, the load profile is a multi-dimensional curve that governs damping performance based on various parameters such as generator voltage, angular velocity, position, or other parameters. In one embodiment, this induced load is created on the generator independent of the output load and power output from the system.

In one embodiment, the system provides for several such controllers to be used simultaneously. For example, a vehicle may have four regenerative shock absorbers and a regenerative braking system all generating electricity simultaneously.

In order to not damage vehicle electrical system components (such as batteries and on-board equipment), load profile controllers are able to communicate with one another over communication buses such as the CAN bus. Over this communication bus, central controllers such as a dedicated regenerative controller disclosed herein, an automotive electronic control unit (ECU), or several such devices, can issue new load profiles for load profile controllers. With this capability, damping characteristics in several regenerative devices may be dynamically changed.

In one embodiment, a distributed configuration may be employed. In this embodiment, each load profile controller releases output power directly onto the vehicle electrical system or battery(s). A regeneration controller, ECU, or other load profile controller(s) can direct this flow, issuing commands to particular load profile controllers and limiting, for example, power output onto the vehicle electrical system.

In another embodiment, a centralized configuration may be employed. In this embodiment, load profile controllers output power to a centrally-switched regeneration controller that shuttles power to various energy storage devices and/or energy consuming devices such as auxiliary batteries, capacitor banks, and/or on-board power consuming equipment. Because communication may be bidirectional, individual load profile controllers may be able to report data to central controllers such as one or more ECUs.

Aspects relate to regenerative energy generator controllers (also referred to herein as "load profile controllers") that modulate load on a generator, and a system of interconnecting multiple such power generation and load control devices to a vehicle's power systems. It should be appreciated that load on the generator may be viewed as the resistance or impedance across the terminals of the generator. Thus, a lower resistance or impedance represents a greater load. Induced load is the load that the generator creates by back EMF, that is, the back force on the generator making it difficult to turn the generator. When the electrical load across the generator, namely "on" the generator is large (low impedance), the mechanical load that the generator produces on the output shaft is also large.

Figure 1B:
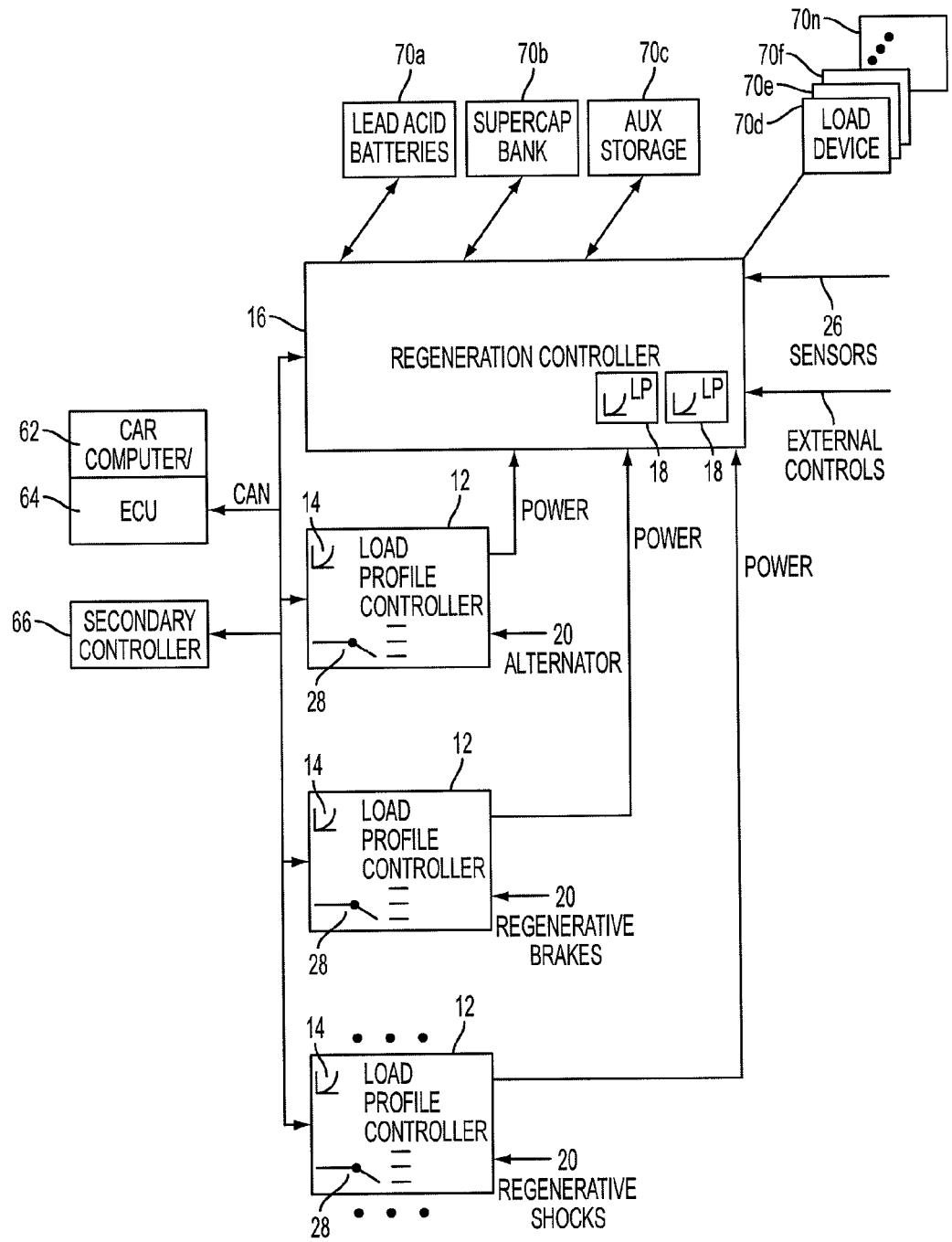
FIG. 1B is an embodiment of a system overview showing several load profile controllers with power generating devices attached, and a central regeneration controller in a centralized power flow control configuration.

In one embodiment, as shown for example in FIGS. 1A and 1B, the overall system 10 may include several load profile controllers 12 that store and/or use particular load profiles 14, a central regeneration controller 16 that can store or otherwise use load profile presets 18 and switch different input power sources 20 to several energy storage devices 70a, 70b, 70c and energy consuming devices 70d, 70e, 70f (e.g., various electricity consumers on a vehicle) and several sensors 26 that interact with the system. Such sensors may include one or more of the following sensors in any suitable combination for detecting characteristics that relate to movement or state of one or more components of the system (such as vehicle wheels, suspension components, etc.): accelerometer(s), position sensor(s), ride performance switch(es), battery temperature sensor(s), etc. Other sensors may be employed, as aspects of the present invention(s) are not limited in this respect.

Each load profile controller 12 in this embodiment includes switching circuitry 28 (shown in more detail, for example, in FIG. 2A) that uses pulse-width modulation (PWM) to switch a connection of an associated generator 20 between a circuit having a high impedance state (e.g., a circuit including a high resistance element such as an open circuit), a circuit having a low impedance state (e.g., a circuit including a low resistance element 30 such as a short circuit), an output load 32, and optionally, an internal energy storage device such as a super capacitor 34. Load profile controllers 12 may also include internal memory 36 containing a load profile 14 and communicating with a processor 38, sensors 40 to measure voltage and current from the generator 42 and optionally transient voltage spike protection with the use of, for example, a snubber circuit 44, and optionally voltage regulation circuitry 80 (which can include a DC-DC converter 48, a voltage clamp 50 and a diode 52, each of which is individually optional).

It should be appreciated that the control arrangement can be implemented utilizing any suitable computer, including a single device or distributed across a plurality of devices coupled in any suitable way. In one exemplary computer system a computing device includes at least one processor 38 and memory 36. Depending on the configuration and type of computing device, memory may be volatile (such as RAM), non-volatile (such as ROM, flash memory, etc.) or some combination of the two. The device may include at least some form of non-transient computer readable media, e.g., for storing software and/or other instructions used by the controller to control its operation and the operation of other system components. By way of example, and not limitation, computer readable media may comprise computer storage media. For example, the device may also include storage (removable and/or non-removable) including, but not limited to, magnetic or optical disks or tape. Such additional storage may be removable storage and non-removable storage. Computer storage media may include volatile and nonvolatile media, removable, and non-removable media of any type for storing information such as computer readable instructions, data structures, program modules or other data. Memory, removable storage and non-removable storage all are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by the device. Any such computer storage media may be part of the device. The device may also contain network communications module(s) that allow the device to communicate with other devices via one or more communication media. By way of example, and not limitation, communication media may include wired media such as a wired network or direct-wired connection, and wireless media such as acoustic, RF, infrared and other wireless media. Network communication module(s) may be a component that is capable of providing an interface between the device and the one or more communication media, and may be one or more of a wired network card, a wireless network card, a modem, an infrared transceiver, an acoustic transceiver and/or any other suitable type of network communication module.

In one embodiment, the techniques described herein may be implemented via software code that is stored on one or more computer readable media and includes instructions that when executed (e.g., on a processor) implement parts or all of the techniques described herein.

The device may also have input device(s) or the ability to connect with input devices (whether wirelessly or wired) such as a keyboard, mouse, pen, voice input device, touch input device, etc. Output device(s) such as a display may also be included. All these devices are well known in the art and need not be discussed at length here.

It should be appreciated that the techniques described herein are not limited to executing on any particular system or group of systems. For example, embodiments may run on one device or on a combination of devices. Also, it should be appreciated that the techniques described herein are not limited to any particular architecture, network, or communication protocol.

In one embodiment, each load profile controller 12 produces a given damping curve or otherwise sets a kinematic characteristic function on its connected load. Within the confines of this damping curve or kinematic characteristic function (herein also called the "load profile"), the load profile controller 12 optimizes its switching to provide the maximal amount of generated energy as an output. The system can have these load profile controllers configured into either a distributed configuration, a centralized configuration, or a hybrid of the two. Other suitable configurations may be employed, as aspects of the invention(s) are not limited in this regard.

Referring again to FIG. 1A, one embodiment of a distributed configuration will now be discussed. In one embodiment, multiple load profile controllers 12 exist on the vehicle platform without the need for any centrally-located controller. Instead, generated power is output directly to a usable load such as a bank of auxiliary batteries or, in one embodiment, the vehicle electrical system. Each load profile controller 12 has its own load profile(s) that governs damping or other kinematic performance on its connected power generator 20. An example of such a load profile would be a double-linear response for a regenerative shock absorber that has two lines: each line with a different slope and corresponding to either jounce or rebound strokes of the shock absorber. Of course, other load profiles may be employed as aspects of the invention(s) are not so limited.

While such a configuration of several load profile controllers outputting energy onto the vehicle electrical system generally works, in some embodiments, it may be desirable to coordinate these load controllers 12. Factors such as battery temperature and maximal charging current are important in maintaining total battery life. If, for example, a vehicle employing a system utilizing five load profile controllers (suppose four regenerative shock absorbers and a regenerative drive motor/brake) were to suddenly drive over a large bump and the driver abruptly and forcefully brakes, suddenly five independent load profile controllers will be emitting large amounts of energy onto the vehicle electrical system. Coordination not only allows these load profile controllers 12 to protect vehicle systems by either dissipating or storing this excess energy, but it also allows better utilization of the energy. An example of this is as follows: load profile controllers 12 are connected on the output to a vehicle's electrical system that has equipment that is drawing an average of 500 watts from an alternator. The vehicle then rides over a large bump and for a short period 2 kilowatts of average power is generated. Without energy storage, only 500 watts out of the 2 kilowatts can be used by the output load. If a short-term storage device such as a super capacitor is switched on (e.g., connected to one or more of the generators), however, energy during the large amplitude event can be stored in a capacitor and then discharged to the output load when the vehicle is back over flat terrain and generating, for example, less than the 500 watts the load is drawing.

In one embodiment, the distributed configuration contains an optional regeneration controller 16 that can issue commands to the load profile controllers 12, for example, to direct energy to internal storage capacitors or to shunt off excess energy instead of overloading the vehicle power bus. Because communication occurs in a distributed manner over a common communications bus 60 (FIG. 1A) such as a vehicle CAN bus, these commands can originate from any one or more devices such as an ECU 64, or a secondary controller 66.

In addition to advanced power management and coordination, in one embodiment, the distributed load profile controllers 12 can receive updated load profiles that are sent over the communications bus. As mentioned previously, load profiles can include look-up tables (and/or equations) that map sensed parameters such as generator voltage to force responses and/or loads. In one embodiment, for example, a centralized regeneration controller 16 can be specifically tuned for regenerative shock absorbers that use load profile controllers. The central regeneration controller 16 can issue particular load profiles to the load profile controllers 12 that represent luxury ride performance curves. Or they may issue load profiles that represent sport tuned performance curves. Because these are sent over a shared communications bus, even the car computer can issue these load profile updates. Generally, updates to load profiles may be triggered based on sensor events. An example of this is braking. If a sudden braking event occurs, the ECU can send a stiffer (greater load) load profile to the front regenerative shock absorbers to reduce nose dive during the braking event, thus maintaining traction and maintaining or reducing the stopping distance of the vehicle. In one embodiment, the communication bus (CAN bus 60) is bidirectional, so it is also possible for the load profile controller to report information such as generator velocity to units such as ECUs for a variety of purposes, such as, for example, diagnostics.

A centralized configuration described below with reference to FIG. 1B, is similar to the distributed system described above with reference to FIG. 1A, except in how output power is routed. In the distributed configuration, load profile controllers 12 can be placed around a vehicle system and power output wires can be connected where desired. In the centralized system, the regeneration controller 16 acts as a switching power router that intelligently chooses how to route generated energy between various vehicle energy storage devices and other load devices (e.g., power consumers) that can include, for example one or more of the following: the main battery 70a, auxiliary batteries 70b, capacitor banks 70c, and onboard power-consuming devices 70d, 70e, 70f, . . . 70n. Of course there can be any number of such devices as aspects of the invention(s) are not limited in this regard. A controller 16 switches the power input from each load profile controller 12 to the appropriate output port. In one embodiment, the switching algorithm can be customized for the specific vehicle platform. By controlling energy routing, the vehicle can intelligently use alternative storage devices, and regenerative devices benefit from common storage devices, thus reducing redundancy.

As discussed above, one or more load profile controllers may use a switching strategy that switches between the output load, a high impedance state, and a low impedance state to control a kinematic characteristic (e.g., damping) of a generator. FIG. 2A shows one embodiment of such a switching system. In this MOSFET-based circuit, a generator 42 is connected to two devices, namely for example, a resistor 30 and a power converter 80 that is connected to an output load shown generally at 32, each switched with a MOSFET 82a, 82c. In one embodiment, the gates of these MOSFETs are controlled using a switching strategy, as shown in the illustrative example of FIG. 3A depending on the damping the load profile for the current system parameters requires. In this embodiment, a DC generator 42 is connected such that it turns in one direction. Using a full wave rectifier, it is possible to connect an alternating direction or three-phase AC motor to this embodiment.

If the effective average load of the output load 32 is lower than that required on the terminals of the generator 42 for appropriate damping as determined by the load profile (meaning the effective impedance on the generator 42 is higher than that required for appropriate damping), then the load profile controller 12 may be employed to dissipate more energy than the output can consume. To do this, in one embodiment, the control circuitry switches to a Load Low mode 90, as shown in FIG. 3A where resistor gate 82a and output load gate 82c are powered with a quickly alternating duty cycle. The duty cycle of this pulse-width modulation (PWM) sets the effective load of the generator 42 between that of the low impedance state (e.g., a resistance element 30 or short circuit) and the output load 32. In this mode, energy is wasted because the output power source cannot handle the additional energy being generated.

If the effective average load of the output load 32 is greater than that required on the terminals of the generator 42 for appropriate damping as governed by the load profile (meaning the effective impedance on the generator 42 is lower than that required for appropriate damping) then the control circuitry switches into Load High mode 92, as shown in FIG. 3A. In this mode, the controller 12 switches the gate 82c of the output load with a duty cycle to create the desired effective load. The gate 82a of the low resistance element MOSFET control remains off. By connecting the generator 42 to the output load 32 only part of the time in each clock cycle, the average load the generator experiences is less than if it were connected the whole time. Using fast PWM, the effect is that the system filters out the transient load effects of switching. It should be noted that a potentially important challenge this switching strategy overcomes (at least for some embodiments) is the fact that the output load does not have a known resistance or impedance, and it may vary depending on conditions such as vehicle battery charge level and hotel total load of the vehicle.

In some embodiments, it may be desirable or more efficient to minimize switching. In this regard, the system may have three special cases. If the output load is very close to that required for appropriate damping given the current load profile, the system connects the generator 42 to the output load 32 without switching. In this Load Match mode 94, as shown in FIG. 3A, the resistor gate 82a (see FIG. 2A) is off and the output load gate 82c (see FIG. 2A) is constantly on. If the system needs maximal damping, the resistor gate 82a (see FIG. 2A) is connected high constantly, while the output load gate 82c (see FIG. 2A) is connected low. If the system needs minimal damping, both the resistor gate 82a and the output load gate 82c are connected low. In this case the generator 42 is essentially disconnected from any load.

In another possible mode of operation, it may be desirable to dynamically switch between all three modes: Load Low 90, Load High 92, and the output load 80. Such Load Protect 96 operation allows the system to shunt off excess energy in the event that an overcurrent condition occurs on the output load 32. This protection mode of operation would be chosen by the controller if normal operation (Load Low 90, Load High 92, Load Match 94 modes) results in more current going to the output load than the vehicle electrical system is specified to handle.

The load profile controller embodiment described above with reference to FIG. 2A contains, in one embodiment, several protection circuits including: 1) a snubber circuit 44 that harnesses transient voltage spikes created by the inductive generator during switching, 2) a clamp circuit 50 that protects the output load from rising above a given "safe" voltage, and 3) a DC-DC converter 48 such as a buck/boost converter to regulate voltage to a safe level. Depending on the output load, the buck/boost converter may not be necessary.

As shown in FIG. 2A, an energy storage device 34 such as a super capacitor may be utilized. This optional component can be switched by operating the energy storage MOSFET gate 82b. This allows the load profile controller to induce a large load on the generator 42 for a period of time (depending on the level of charge stored on the capacitor) while harnessing energy (instead of dissipating through the load resistor 30).

In one embodiment, the load profile controller 12 includes one or more sensors 40 to read the voltage and current from the generator 42. This information is used to calculate the average load the generator is seeing, e.g., the effective impedance across the terminals of the generator 42. An additional voltage sensor may be used for bidirectional systems where a rectifier is placed between the generator and the power electronics so that the load profile controller can determine the direction the generator is spinning or otherwise moving (e.g. in the case of a linear generator). Such information is useful in circumstances such as regenerative shock absorbers where piston travel direction is typically an independent variable in a load profile.

It should be appreciated that the load controller 12 depicted in FIG. 2A does not necessarily include the generator 42, the load 32 and the energy storage device 34. Instead, those components are shown in FIG. 2A as operatively coupled with the load controller 12, although portions of the generator 42, the load 32 and/or the energy storage device 34 may in some cases be considered to be included with the load controller 12.

Figure 2B:
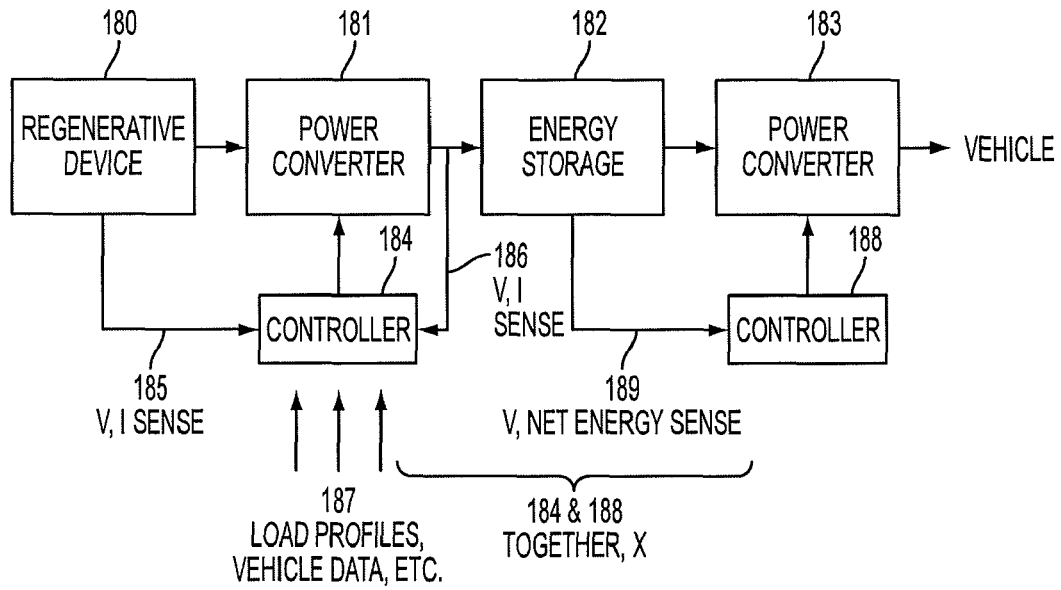
FIG. 2B is a block diagram of a multi stage switching load profile controller.
Figure 3B:
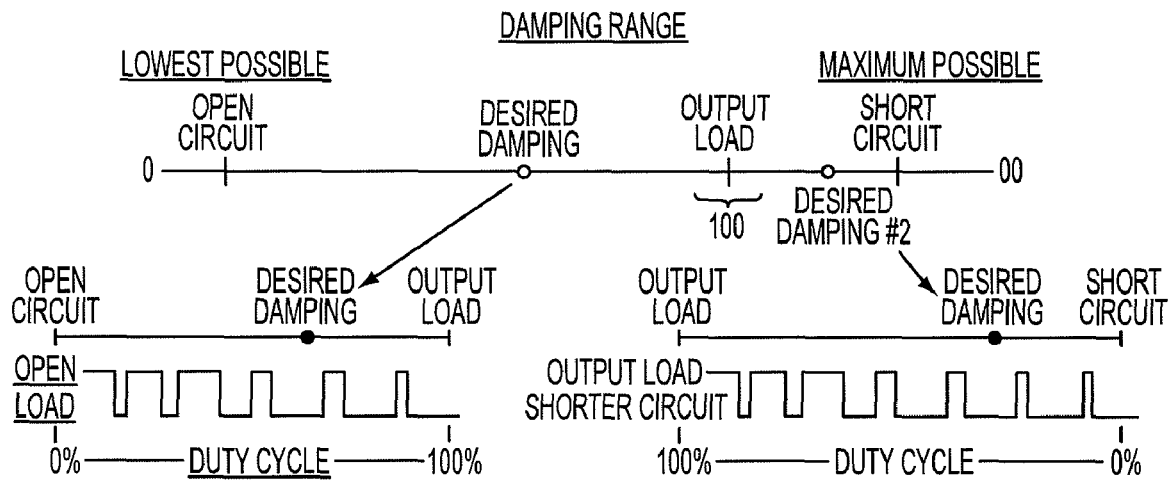
FIG. 3B is a chart representing an example of output load resistance spectrum and a mapping between effective impedance and switch controls.

In another embodiment, the load controller depicted in FIG. 2A can be alternatively implemented with two stages of electrical power converters 181 and 183 and an intermediate storage device 182, as shown in FIG. 2B. A regenerative device 180 outputs power directly into the first converter 181. This converter 181 handles damping or other control of a kinematic characteristic through an active controller 184. The controller 184 is equipped to measure the regenerative device outputs 185 and the output of the converter 181, as well as input parameters 187 from the rest of the vehicle, such as load profiles or data from standard on-board vehicle sensors. The output of the first converter 181 may be directed into an energy storage device 182 such as a battery pack or bank of ultracapacitors. A second stage power converter 183 takes the stored energy from the energy storage device 182 and outputs it in a form useful to the vehicle, such as constant-voltage output power to displace current from the alternator. The second converter 183 has a controller 188 that is able to sense the state of energy storage device 182 and intelligently manipulate the converter 183 such that the stored energy is released to the vehicle in a maximally efficient form. This two-stage design conceptually and operatively decouples damping (or other kinematic characteristic control) on the regenerative device from output to the vehicle electrical system.

Figure 2C:
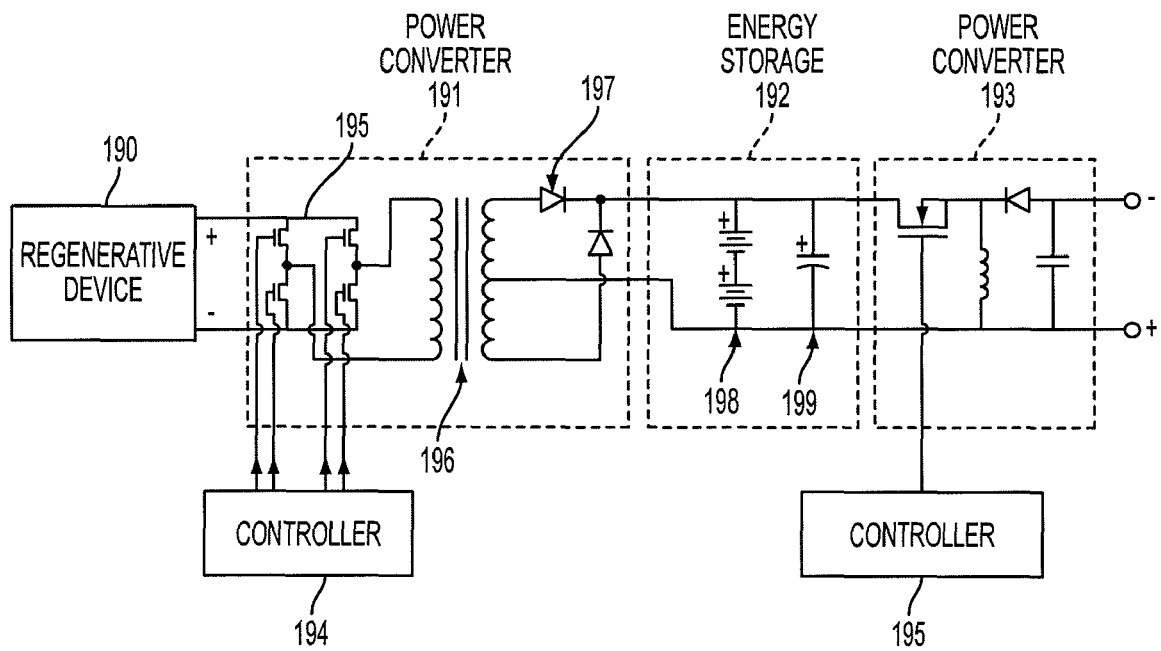
FIG. 2C is a schematic showing selected circuit components in a two-stage switching load profile controller.

A component-level embodiment of FIG. 2B is shown in FIG. 2C. The regenerative device is connected to a full-bridge DC/DC converter 191 which offers electrical isolation of the device 190 from the vehicle systems through a transformer 196. Selection of the turns ratio of the transformer 196 allows the system to be fine tuned for the specified output voltages of the regenerative device 190 and the maximum voltage of the energy storage devices 192. The controller 194 of the full-bridge converter operates by modulating the timing of the switch components 195, and the output of the converter is rectified through diodes 197 into the energy storage devices 192, which may include batteries 198 for high energy density storage and/or capacitors 199 for improved pulse power capabilities. These components minimize the ripple in power output of the device as a whole, as well as decouple the control of the regenerative device (handled by the first controller 194) from the control of the instantaneous system output (handled by the second controller 195). Energy from the storage components 198, 199, is converted and routed to the vehicle through a buck-boost converter 193.

Turning now to FIG. 3A, one embodiment of an operating spectrum of the load profile controller is shown. Ideally, the load profile controller would be able to induce an effective impedance on the generator spanning from zero to infinity. In one embodiment, the operable range is between the high impedance state (e.g., an open circuit where minimal damping comes from frictional losses) and the low impedance state (e.g., a short circuit or low-resistance element 30). Depending on where the output load lies on the damping spectrum and where the desired damping point for the current system parameters lies on the given load profile curve, the circuit could be in different modes of operation. In Load High mode 92, a duty cycle is induced to mix high impedance and output load impedances such that the average load matches the desired damping. In Load Low mode 90, a duty cycle is induced to mix low resistance and output load impedances such that the average load matches the desired damping.

Controlling the load profile controller is non-trivial because there is no a priori knowledge of the output load impedance. While several systems in the prior art assume the output load does not change impedance, in accordance with one aspect of the invention, this system is able to measure and adjust for changing output load impedance. Since output load impedance (e.g., of the vehicle electrical system) changes in typical operation, it is unknown where the output load line 100 (see FIG. 3B) lies on the damping chart. In order to calculate this, the load profile controller can employ either closed-loop feedback or open-loop control. Other suitable control arrangements may be employed, as aspects of the present invention(s) are not limited in this regard.

Figure 4A:
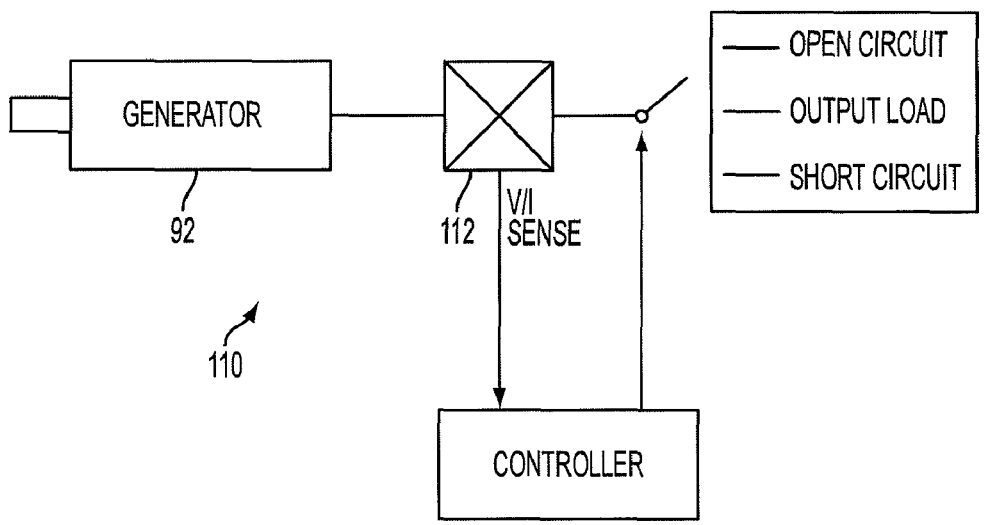
FIG. 4A is a schematic representation of a sensing configuration of a load profile controller that implements closed loop or open-loop feedback.

In one embodiment, a closed-loop feedback configuration 110, as shown in FIG. 4A, includes a voltage and current sensor 112 attached to the output terminals of the generator 42. With this placement, a microcontroller 38 of the load profile controller can calculate the exact effective resistance the generator is seeing by applying Ohm's law $R=V/I$.

Figure 4B:
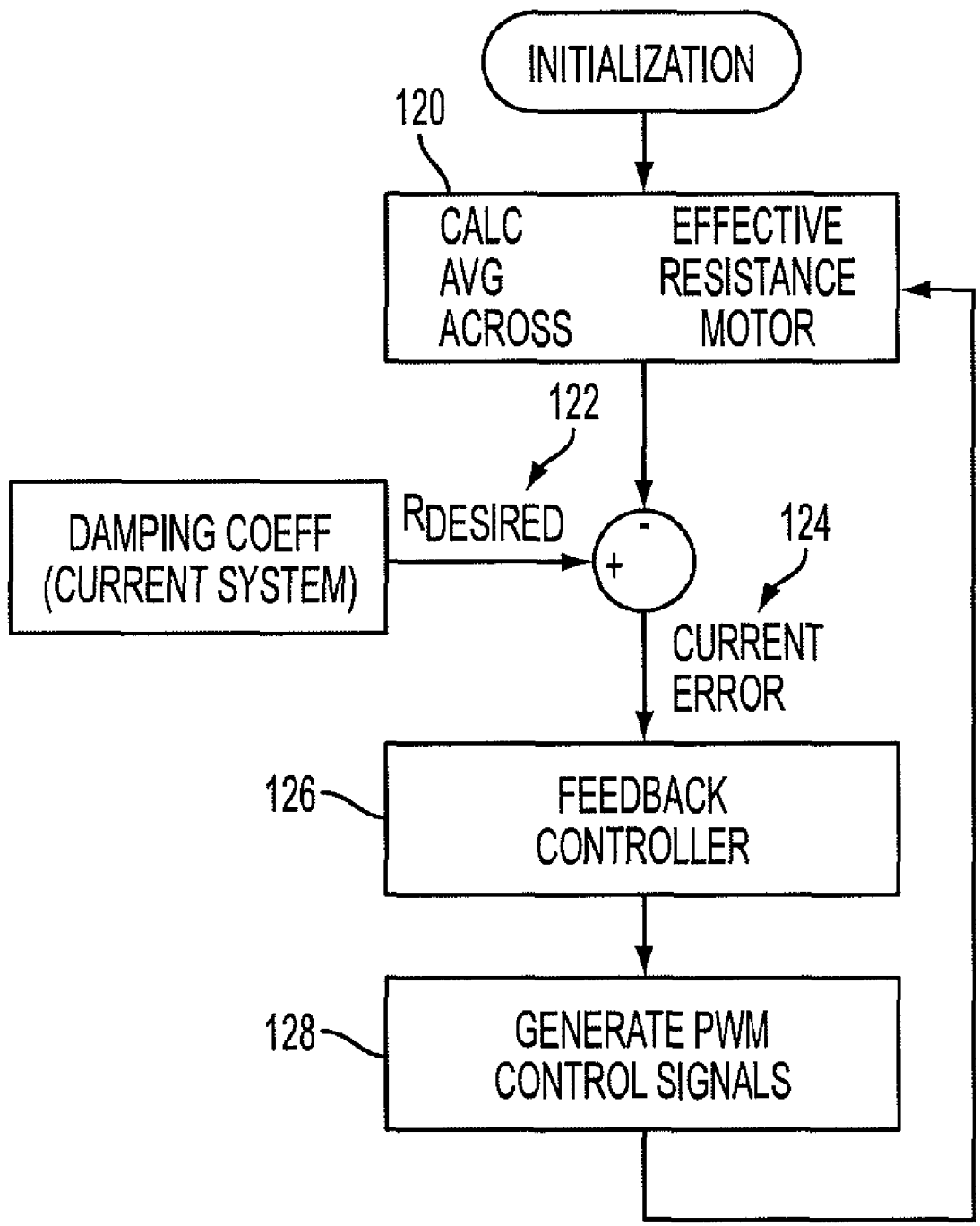
FIG. 4B is an illustrative embodiment of a control loop implementing closed-loop feedback.

In one embodiment, the system implements a software control loop, as shown in FIG. 4B to control switching. In a first process, at S120, several current/voltage samples are taken from the generator sensor and then averaged. This period is much longer than the PWM switching period. This resistance is then subtracted from the desired resistance at step S122 that the load profile curve dictates is necessary for appropriate damping given the current system parameters, resulting in a measured error at step S124. This error is then fed into a feedback controller in step S126 such as a PID (proportional, integral, derivative) control loop which combines multiple terms to generate a control action. This control action is then translated to PWM control signals in step S128 as in FIG. 3B.

Figure 5A:
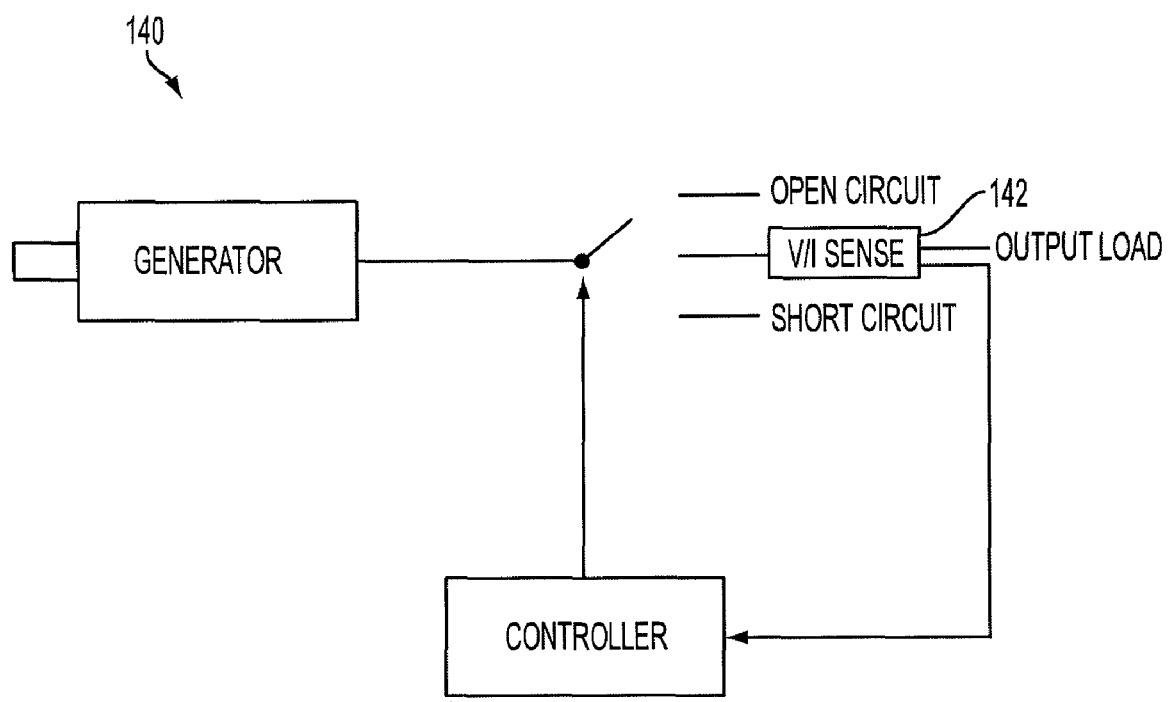
FIG. 5A is a schematic representation of a sensing configuration of a load profile controller that implements open loop feedback.

In one embodiment, an open-loop controller configuration 140, as shown in FIG. 5A, includes a voltage and current sensor 142 placed on the output load to directly measure the effective impedance of the output load, the unknown parameter that necessitates a control loop in the first place. In this embodiment, this placement does not necessarily require a hardware reconfiguration from that shown in FIGS. 2A-2C. If the hardware shown in FIG. 2A is used and the voltage/current is only sensed during the parts of the PWM cycle where the generator is connected to the output load, the reading will be very close to that of having the generator physically on the output. The system implements a software control loop, as shown in the illustrative embodiment of FIG. 5B, to control switching.

Figure 5B:
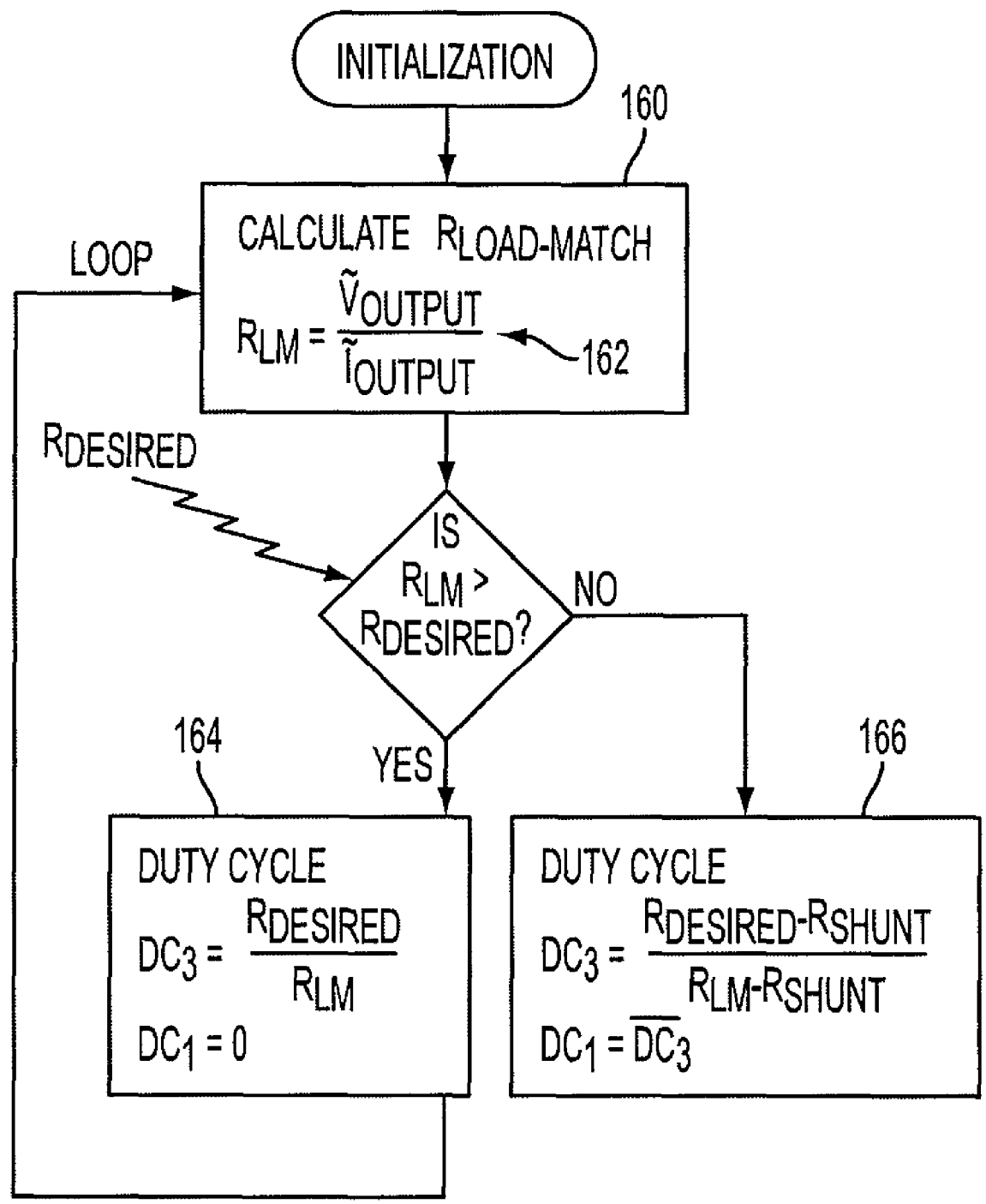
FIG. 5B is an illustrative embodiment of a control loop implementing open-loop feedback.

Referring to FIG. 5B, the effective resistance of the output load is calculated at step S160 during a period of current draw into the output load. This resistance is calculated using Ohm's Law of the average voltage and currents in step S162 during conduction with the output load. If this average resistance is greater than the desired resistance for damping as specified by the current load profile, then the system operates in Load High mode 92 (see FIG. 3A) commanding at step S164 appropriate duty cycles on the switches. If the average resistance is less than the desired resistance for damping as specified by the current load profile, then the system operates in Load Low mode 90 (see FIG. 3A) commanding at step S166 appropriate duty cycles on the switches.

Figure 6:
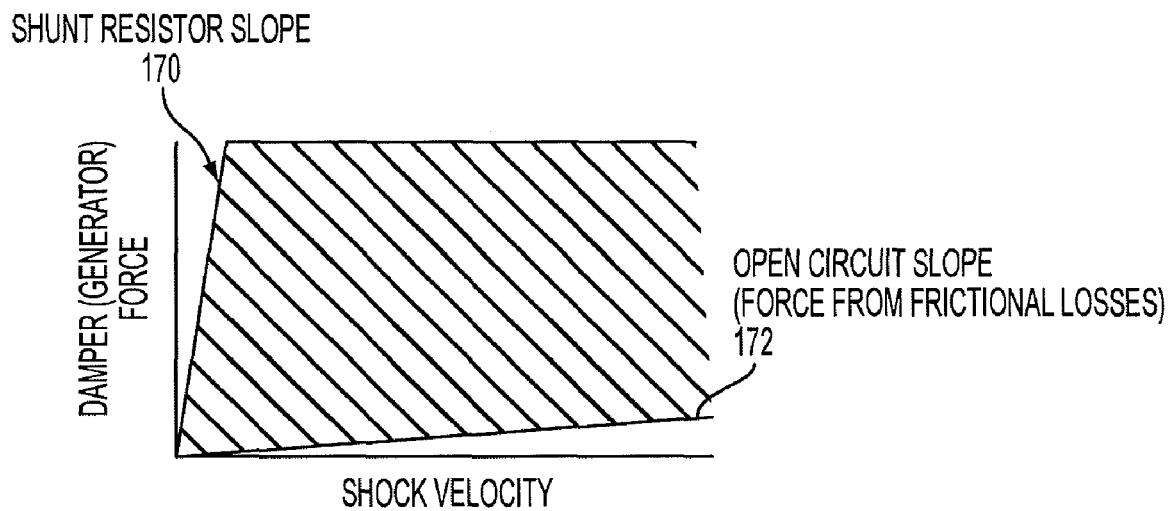
FIG. 6 represents an embodiment of an operable damping range for a load profile controller.

By dynamically switching between the output load and a low impedance state (e.g., a short circuit) or the output load and a high impedance state (e.g., an open circuit), the load profile controller is able to affect a large dynamic range on the connected generator. This may be especially useful when semi-active control of the regeneration device is required. For example, with such a controller it may be possible to perform partial and/or complete braking with a regenerative brake motor by modulating the damping to the appropriate degree. In another application, it is possible to create a semi-active suspension where the shock is able to induce a large dynamic range of forces for a given input velocity, as shown, for example in FIG. 6. In another application where more energy is being generated than the output can accommodate, it may be desirable to switch between the energy storage device and the output load. An example of this is the control system being coupled to a vehicle alternator in a configuration where the alternator is a regenerative device. During a vehicle braking event, the control system can be employed to induce a greater load (damping) on the alternator, storing the energy in the energy storage device. This effectively adds regenerative braking capability to a conventional (non-hybrid) vehicle.

The limits to the dynamic range are generator winding and low impedance state, depicted as shunt resistor slope 170, and system frictional losses, depicted as open circuit slope 172. The dynamic range represents, in one embodiment, the valid set of points that a load profile can lie within.

Figure 7A:
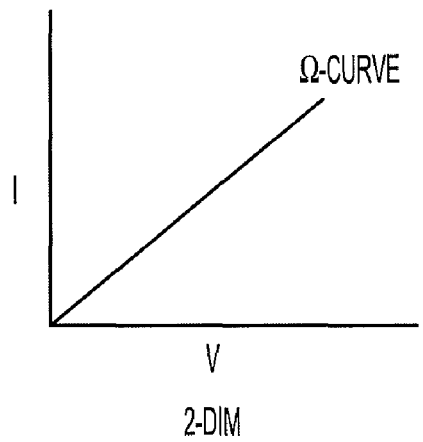
FIG. 7A is a representation of a linear load profile curve based on one independent variable.
Figure 7B:
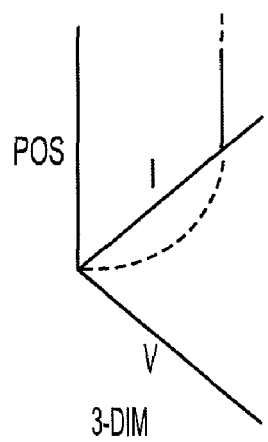
FIG. 7B is a representation of a non-linear load profile curve based on multiple independent variables.

Load profiles according to some embodiments are depicted in FIGS. 7A and 7B. A load profile may be represented as a graph that plots damping performance or another kinematic characteristic based on one or more independent variables. In one embodiment, as shown in FIG. 7A, a force is induced based on velocity v of the generator shaft (or equivalently for some regenerative shocks, the velocity of the piston). This equates to current I based on voltage of the motor. A linear curve (see, e.g., FIG. 7A) might, for example, mimic the desired performance of a standard shock absorber. Load profiles can also be multi-dimensional and utilize information from a number of sensors. In one example (as depicted in FIG. 7B) damping force (in this case equivalent to current I) is governed by both generator angular velocity (equivalent to voltage v in a motor) and a position sensor pos such as a linear potentiometer mounted on a shock absorber.

The disclosed system(s) are load control devices that may be used to set different load profiles on an electricity-generating device. While it has been described in light of a vehicle system, especially as related to regenerative shock absorbers, the technology may be generalized to accommodate other energy generating devices such as wind turbines, solar panels, and linear wave power generators for non-automotive applications.

It should be understood that the foregoing description is intended merely to be illustrative and that other embodiments, modifications, and equivalents are also contemplated. Further, although each embodiment described includes certain features, aspects of the invention(s) are not limited in this respect. Thus, one or more of the described or other features or methods of the control arrangement may be employed singularly or in any suitable combination, as aspects of the invention(s) are not limited to a specific embodiment.

The invention claimed is:

1. A system that manages power output from one or more energy generators, the system comprising:
at least one power controller having an input for connection to an energy generator to receive electrical power generated by the energy generator and an output for connection to an electrical load to provide electrical power to the electrical load, the power controller including:
switching circuitry to set an effective impedance of the energy generator to control a kinematic characteristic of the energy generator that influences motion of a mechanical system, and wherein the switching circuitry is arranged to provide an amount of power to the electrical load that meets a demand of the electrical load while maintaining the set effective impedance of the energy generator, wherein the amount of power provided to the electrical load is unequal to an amount of power provided by the energy generator to the power controller.

2. The system of claim 1, wherein the effective impedance is maintained and the demand of the electrical load is met over an extended time period.

3. The system of claim 1 further comprising an energy storage device to store electrical energy provided by the energy generator during time periods in which the energy generator outputs an amount of power that exceeds the amount of power provided to the electrical load.

4. The system of claim 3, wherein the energy storage device releases energy to the electrical load during time periods in which the energy generator outputs an amount of power less than the amount of power provided to the electrical load.

5. The system of claim 1 further comprising an energy dissipative device to dissipate electrical energy provided by the energy generator during time periods in which the energy generator outputs an amount of power that exceeds the amount of power provided to the electrical load.

6. The system of claim 1, wherein the switching circuitry switches the energy generator between one or more circuits providing different impedance states, one or more energy storage devices and/or one or more energy consuming devices.

7. The system of claim 1, wherein the switching circuitry compensates for a changing electrical load to maintain a desired effective impedance for the energy generator.

8. The system of claim 1, wherein the power controller circuitry is arranged to vary power output to the electrical load based on a changing demand from the electrical load.

9. The system of claim 7, wherein the power controller circuitry is arranged to vary power output to the electrical load while maintaining the set effective impedance constant.

10. The system of claim 1, wherein the energy generator generates electrical energy based on movement of the mechanical system.

11. The system of claim 1, wherein the kinematic characteristic of the energy generator defines a damping effect of the energy generator on the mechanical system.

12. The system of claim 1 in combination with a vehicle suspension and the electrical load of an electrical system of the vehicle, wherein the control circuit receives electrical energy from a plurality of energy generators, sets an effective impedance for all of the energy generators and maintains the set effective impedances for the energy generators while providing an amount of power to the electrical load that meets a demand of the electrical load but is unequal to an amount of power provided by the energy generators.

13. A power electronics system for use with a system including an electrical power generator and an electrical load, the power electronics system comprising:
one or more circuits having different impedance states;
one or more switches that connect the electrical power generator to any one of the circuits having different impedance states; and
a controller that selectively operates the one or more switches to selectively connect the electrical power generator to one of the circuits to control the average impedance on the electrical power generator, and simultaneously selectively operates the switches to control an amount of electrical power delivered to the electrical load, wherein the amount of electrical power delivered to the electrical load is controlled independently of the average impedance on the electrical power generator.

14. The system of claim 13 further comprising an energy storage device that stores energy during periods when power output by the electrical power generator exceeds power demand by the electrical load, and that provides energy to the electrical load during periods when power output by the electrical power generator is less than power demand by the electrical load.

15. The system of claim 13 further comprising a transformer that provides electrical isolation between the electrical power generator and the electrical load.

16. The system of claim 15, wherein the transformer provides a voltage scaling step within the controller.

17. The system of claim 13, wherein the energy storage device is connected to a power converter that outputs electrical power to the electrical load.

18. The system of claim 13 further comprising an energy dissipative device that converts electrical energy into heat.

19. The system of claim 13, wherein the controller selects one or more of the one or more circuits for connection to the electrical power generator based on a load profile.

20. The system of claim 19, wherein the controller uses multiple different load profiles to control the effective impedance on the electrical power generator.

21. The system of claim 13, wherein the controller uses pulse width modulation (PWM) to operate the one or more switches.

22. A system comprising:
at least one electrical power generator operatively linked to a movable component of the system such that adjustment of an effective impedance of the at least one electrical power generator controls the kinematic characteristic of the at least one electrical power generator which affects movement of the movable component;
at least one electrical load including one or more electrical components of the system; and
a control circuit having an electrical power output to deliver energy to the at least one electrical load and at least one input connected to the at least one electrical power generator, the control circuit including one or more circuits that set an average load across terminals of the at least one electrical power generator, wherein the average load across terminals of the at least one electrical power generator is set independently of an impedance of the at least one electrical load, and wherein the control circuit selectively operates one or more switches to control an amount of electrical power delivered to the electrical load, wherein the amount of electrical power delivered to the electrical load is controlled independently of the effective impedance on the electrical power generator.

23. The system of claim 22, wherein the control circuit comprises:
a circuit providing a low impedance state;
a circuit providing a high impedance state;
an output power converter having an input and an output, the output being connected to at least one electrical load; and
one or more switches that selectively connect the at least one electrical power generator to any one of the circuit providing a low impedance state, the circuit providing a high impedance state and the input of the output power converter.

24. The system of claim 23 further comprising at least one energy storage device to store electrical energy that is produced by the at least one electrical power generator and provided to the at least one electrical load.

25. The system of claim 24, wherein the switches are operated to store energy from the electrical power generator, that is in excess of energy to be delivered to the at least one electrical load, in the at least one energy storage device.

26. The system of claim 24, wherein the switches are operated to release energy stored in the energy storage device to the at least one electrical load.

27. The system of claim 24, wherein the at least one energy storage device is an ultracapacitor.

28. The system of claim 22, wherein the control circuit adjusts the effective impedance to control the kinematic characteristic of the at least one electrical power generator to resist movement of the movable component.

29. The system of claim 22 further comprising one or more sensors that detect characteristics of the system related to movement of the movable component, and the control circuit adjusts the effective impedance of the at least one electrical power generator based on information provided by the one or more sensors.

30. The system of claim 29, wherein voltage is measured across the terminals of the electrical power generator to determine a velocity of the moveable component.

31. The system of claim 29, wherein voltage is measured across the terminals of the generator and an integral of the measured voltage is calculated to determine a position of the moveable component.

32. The system of claim 22, wherein the system interfaces with one or more external sensors, and the control circuit adjusts the effective impedance of the at least one electrical power generator based on information provided by the one or more external sensors.

33. The system of claim 32, wherein an interface between the external sensors and the control circuit is a vehicle communications bus.

34. The system of claim 22, wherein the control circuit includes first and second power converter circuits that are connected together in parallel with an energy storage circuit, the first power converter circuit being connected to the at least one electrical power generator and the second power converter circuit being connected to the at least one electrical load.

35. The system of claim 22, wherein open loop or closed loop feedback is employed by the control circuit.

36. The system of claim 23, wherein the control circuit uses pulse width modulation (PWM) to switch between the circuit providing a low impedance state, the circuit providing a high impedance state and the output power converter.

37. The system of claim 22, wherein the at least one generator is a three-phase AC motor.

38. The system of claim 37, wherein the output of the at least one generator connects to the control circuit through a rectifier.

39. The system of claim 22, wherein the at least one electrical load includes a vehicle electrical bus and/or a vehicle battery.

40. The system of claim 23, wherein the output power converter is a DC-DC converter.

41. The system of claim 23, wherein the output power converter is a buck converter or a buck/boost converter.

42. The system of claim 23, wherein the output power converter is a direct connection between the input and output terminals.

43. The system of claim 23, wherein the output power converter includes voltage feedback circuit that maintains an output voltage level of the output power converter at a given value.

44. The system of claim 23, further comprising a capacitor that maintains an input voltage to the output power converter at an even level, within a voltage fluctuation margin.

45. The system of claim 22, further comprising one or more sensors to determine an average impedance seen by the at least one generator.

46. The system of claim 45, comprising a voltage and current sensor connected to the terminals of the at least one generator.

47. The system of claim 22, wherein the at least one generator provides direct current.

48. The system of claim 23, wherein the movable component includes a shock absorber, and the at least one electrical power generator is coupled to the shock absorber such that movement of a portion of the shock absorber causes the at least one electrical power generator to generate electrical power.

49. The system of claim 48, wherein switching of the power input between the one or more circuits having different impedance states adjusts a damping of the shock absorber.

50. The system of claim 48, wherein the control circuit employs a switching strategy to control a damping of the shock absorber that is independent of power output by the output power converter.

51. The system of claim 23, wherein the at least one generator is a vehicle alternator.

52. The system of claim 51, wherein switching of the power input between the one or more circuits having different impedance states sets an effective impedance of the alternator to control a kinematic characteristic of the alternator pulley.

53. The system of claim 22, comprising a plurality of electrical power generators, and wherein the control circuit sets a different average impedance for each of the electrical power generators.

54. A method for controlling power generation and output in a system, comprising:
providing at least one electrical power generator coupled to a moveable component of a mechanical system, wherein adjusting an effective impedance of the at least one electrical power generator controls a kinematic characteristic of the at least one electrical power generator which influences motion of the moveable component;
receiving electrical power generated by the at least one electrical power generator where the received electrical power is unequal to electrical power output to the electrical load; and
controlling a connection of each of the at least one electrical power generator to a plurality of different impedance states so as to independently control the effective impedance of the at least one electrical power generator and provide a controllable amount of electrical power to the electrical load.

55. A method for controlling a plurality of regenerative power generators, comprising:
providing at least one electrical power generator coupled to a respective moveable component of a mechanical system, wherein adjusting an effective impedance of the at least one electrical power generator controls a kinematic characteristic of the at least one electrical power generator which influences motion of the moveable component;
selecting a desired kinematic characteristic for the at least one electrical power generator;
controlling an effective impedance on each of the at least one electrical power generator based on the selected desired kinematic characteristic; and
providing electrical power produced by the at least one electrical power generator to one or more electrical loads such that control of the effective impedance for the at least one electrical power generator is independent of electrical power provided to the one or more electrical loads.

56. The method of claim 55, wherein the step of selecting a kinematic characteristic comprises selecting a load profile for each electrical power generator.

57. The method of claim 56, wherein the load profile is dependent on at least one sensed variable.

* * * * *